US012649851B1

(12) United States Patent
Williamson et al.

(10) Patent No.: US 12,649,851 B1
(45) Date of Patent: Jun. 9, 2026

(54) ELASTOMERIC CUSHIONING MATERIALS WITH STRAIN RECOVERY AND ANTI-TACK PROPERTIES

(71) Applicant: Purple Innovation, LLC, Lehi, UT (US)

(72) Inventors: Devin Williamson, Midvale, UT (US); Michael Wells, Pleasant Grove, UT (US); Caleb Lundhal, American Fork, UT (US); Jose Jacob Chavez, Lehi, UT (US)

(73) Assignee: Purple Innovation, LLC, Lehi, UT (US)

( * ) Notice: Subject to any disclaimer, the term of this patent is extended or adjusted under 35 U.S.C. 154(b) by 0 days.

(21) Appl. No.: 19/274,123

(22) Filed: Jul. 18, 2025

Related U.S. Application Data

(60) Provisional application No. 63/778,223, filed on Mar. 26, 2025.

(51) Int. Cl.
| | |
|---|---|
| *C08L 53/02* | (2006.01) |
| *A47C 27/00* | (2006.01) |
| *A47G 9/10* | (2006.01) |
| *C08J 3/18* | (2006.01) |
| *C08K 5/01* | (2006.01) |
| *C08K 7/28* | (2006.01) |

(52) U.S. Cl.
CPC ............... *C08L 53/025* (2013.01); *C08J 3/18* (2013.01); *C08K 5/01* (2013.01); *C08K 7/28* (2013.01); *A47C 27/002* (2013.01); *A47G 9/10* (2013.01); *C08J 2353/02* (2013.01); *C08J 2491/06* (2013.01)

(58) Field of Classification Search
CPC ....... C08L 53/025; C08J 3/18; C08J 2353/02; C08J 2491/06; C08K 5/01; C08K 7/28; A47C 27/002; A47G 9/10
See application file for complete search history.

(56) References Cited

U.S. PATENT DOCUMENTS

| | | | |
|---|---|---|---|
| 6,719,941 B1 | 4/2004 | Frohaug et al. | |
| 6,794,440 B2 * | 9/2004 | Chen ..................... | C08L 53/025 |
| | | | 524/505 |
| 6,867,253 B1 | 3/2005 | Chen | |
| 7,964,664 B2 | 6/2011 | Pearce | |
| 8,784,982 B2 | 7/2014 | Pearce et al. | |

(Continued)

OTHER PUBLICATIONS

International Search Report and Written Opinion on PCT/US2025/038527 dated Sep. 16, 2025 (12 pages).

(Continued)

*Primary Examiner* — Catherine S Branch
*Assistant Examiner* — Andrea Wu
(74) *Attorney, Agent, or Firm* — Foley & Lardner LLP

(57) ABSTRACT

The present disclosure is directed to an elastomeric cushioning element. The elastomeric cushioning element may include about 5 wt. % to about 50 wt. % elastomeric polymer network comprising a triblock copolymer having an average molecular weight of about 100,000 Da to about 500,000 Da; and about 50 wt. % to about 95 wt. % plasticizer disposed in the elastomeric polymer network. The plasticizer may include a first plasticizer having an average molecular weight of about 300 Da to about 800 Da and a viscosity at 40° C. of about 20 cSt to about 10,000 cSt.

19 Claims, 4 Drawing Sheets

(56)     References Cited

U.S. PATENT DOCUMENTS

| | | | |
|---|---|---|---|
| 2004/0229986 A1 * | 11/2004 | Pearce | ................. C08L 51/006 |
| | | | 525/271 |
| 2006/0194925 A1 | 8/2006 | Pearce | |
| 2006/0253988 A1 | 11/2006 | Pearce | |
| 2024/0366523 A1 | 11/2024 | Mizutani | |

OTHER PUBLICATIONS

Hiemenz, Paul C., et al, Polymer Chemistry, Second Edition, CRC Press, Taylor & Francis Group, 2007.

* cited by examiner

Providing a deformed elastomeric cushioning material

210

Heating the deformed elastomeric cushioning material

220

Cooling the deformed elastomeric cushioning material

230

200

ELASTOMERIC CUSHIONING MATERIALS WITH STRAIN RECOVERY AND ANTI-TACK PROPERTIES

This application claims the benefit of and priority to U.S. Provisional Appl. No. 63/778,223, filed Mar. 26, 2025, the contents of which are incorporated herein by reference for any and all purposes.

TECHNICAL FIELD

The present technology relates generally to elastomeric cushioning materials, products including elastomeric cushioning materials, and to methods of making and using elastomeric cushioning materials.

SUMMARY

In an aspect, the present disclosure provides an elastomeric cushioning element including about 5 wt. % to about 50 wt. % elastomeric polymer network comprising a triblock copolymer having an average molecular weight of about 100,000 Da to about 500,000 Da; and about 50 wt. % to about 95 wt. % plasticizer disposed in the elastomeric polymer network; wherein the plasticizer includes a first plasticizer having an average molecular weight of about 300 Da to about 800 Da and a viscosity at 40° C. of about 20 cSt to about 10,000 cSt.

In another aspect, an elastomeric cushioning element for cushioning a body of a person is disclosed. The elastomeric cushioning element includes about 5 wt. % to about 50 wt. % elastomeric polymer network comprising a triblock copolymer having a molecular weight of about 100,000 Da to about 500,000 Da; and about 50 wt. % to about 95 wt. % plasticizer disposed in the elastomeric polymer network; wherein the plasticizer includes a first plasticizer having a molecular weight of about 300 Da to about 800 Da and a viscosity at 40° C. of about 20 cSt to about 10,000 cSt; and a second plasticizer having a molecular weight of about 200 Da to about 500 Da and a viscosity at 40° C. of about 2 cSt to about 20 cSt, the second plasticizer comprising about 0.1 wt. % to about 80 wt. % of the plasticizer.

In another aspect, a method of forming an elastomeric material is disclosed. The method includes dissolving an elastomeric polymer network comprising a triblock copolymer having a molecular weight of about 100,000 Da to about 500,000 Da in a solvent to form a mixture; adding a plasticizer to the mixture, the plasticizer having a molecular weight of about 300 Da to about 800 Da and a viscosity at 40° C. of about 100 cSt to about 10,000 cSt; and removing the solvent from the mixture to form the elastomeric material.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWING

FIG. 3A illustrates self-adhesion of more than 10.83 gram force (gf) for an elastomeric cushioning material made of styrene-ethylene-butylene-styrene triblock copolymer (SEBS) and a plasticizer having a molecular weight of about 200 Da to about 500 Da and a viscosity at 40° C. of about 2 cSt to about 20 cSt. FIG. 3B illustrates self-adhesion of less than 10.13 gf for an elastomeric cushioning material made of styrene-ethylene-butylene-styrene triblock copolymer (SEBS) and a plasticizer having an average molecular weight of about 500 Da to about 800 Da and a viscosity at 40° C. of about 20 cSt to about 10,000 cSt.

FIG. 4A illustrates deformation of the elastomeric cushioning material formed by cooling the material from 40° C. to 25° C. while compressing it. FIG. 4B illustrates the same elastomeric cushioning material as in FIG. 4A after heating the material to 40° C. and cooling it to 25° C. to reverse the deformation shown in FIG. 4A.

DETAILED DESCRIPTION

Figure 1:
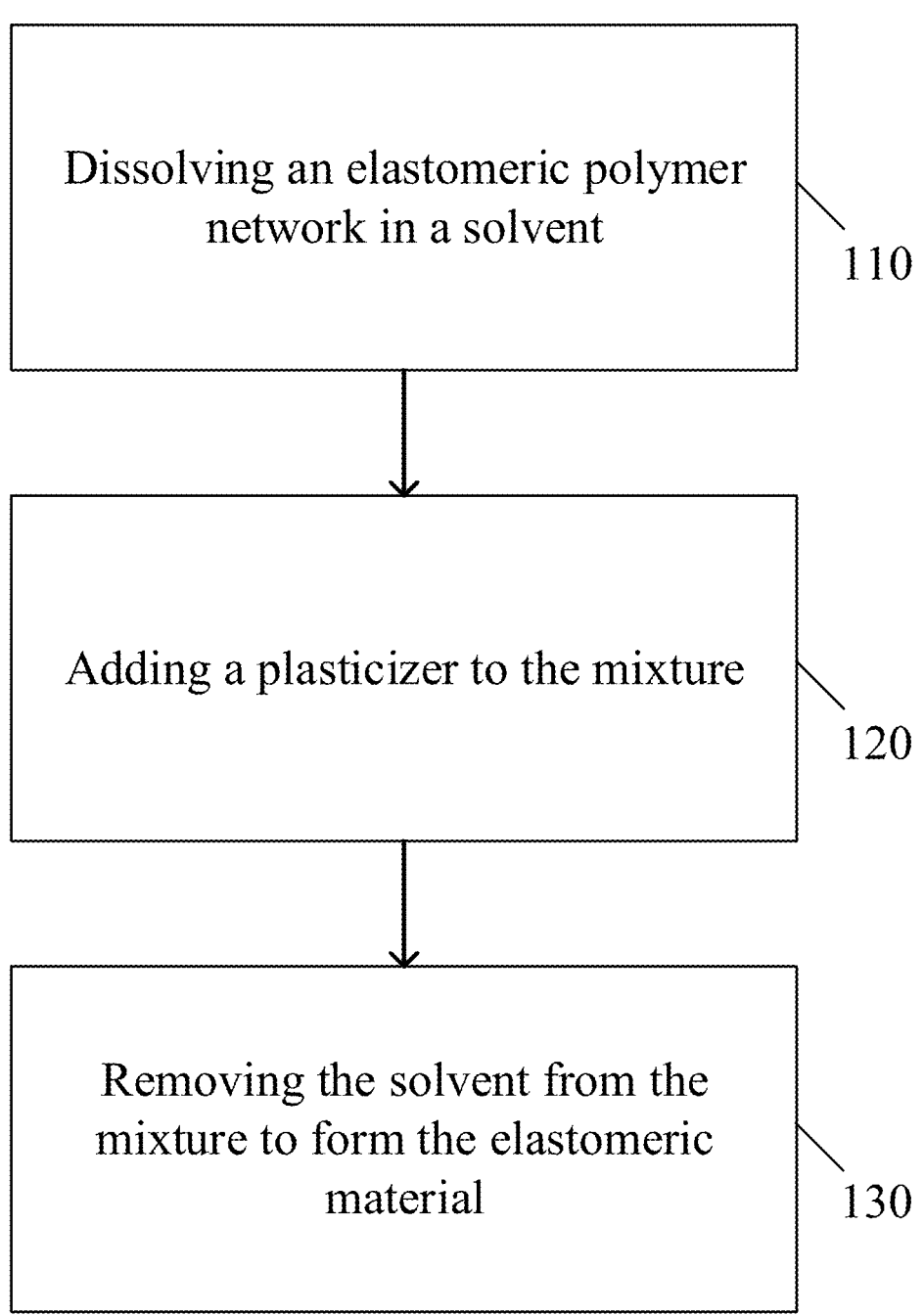
FIG. 1 is a block diagram of a method of forming an elastomeric cushioning material.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

Definitions

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term—for example, "about 10 wt. %" would be understood to mean "9 wt. % to 11 wt. %." It is to be understood that when "about" precedes a term, the term is to be construed as disclosing "about" the term as well as the term without modification by "about"—for example, "about 10 wt. %" discloses "9 wt. % to 11 wt. %" as well as disclosing "10 wt. %."

The phrase "and/or" as used in the present disclosure will be understood to mean any one of the recited members individually or a combination of any two or more thereof—for example, "A, B, and/or C" would mean "A or B or C; A and B; A and C; B and C; or the combination of A, B, and C."

As used herein, "cushioning element" refers to any deformable device intended for use in cushioning one body relative to another. As a non-limiting example, cushioning elements include materials intended for use in cushioning the body of a person relative to another object that might otherwise abut against the body of the person. For example, the cushioning element may include pillows and mattresses.

As used herein, "elastomeric polymer" refers to a polymer capable of at least partially recovering its original size and shape after deformation. In other words, an elastomeric polymer is a polymer having elastic properties. Elastomeric polymers may also be referred to as "elastomers" in the art. Elastomeric polymers include, without limitation, homopolymers (polymers having a single chemical unit repeated) and copolymers (polymers having two or more chemical units).

As used herein, the term "elastomeric block copolymer" refers to an elastomeric polymer having groups or blocks of homopolymers linked together, such as A-B diblock copolymers and A-B-A triblock copolymers. A-B diblock copolymers have two distinct blocks of homopolymers. A-B-A triblock copolymers have two blocks of a single homopolymer (A) each linked to a single block of a different homopolymer (B).

As used herein, the term "plasticizer" refers to a substance added to another material (e.g., an elastomeric polymer) to increase a workability of the material. For example, a plasticizer may increase the flexibility, softness, or extensibility of the material. Plasticizers include hydrocarbon fluids, such as mineral oils. Hydrocarbon plasticizers may be aromatic, aliphatic, or a combination thereof.

As used herein, the term "elastomeric cushioning material" means and includes elastomeric polymers and mixtures of elastomeric polymers with plasticizers and/or other materials intended for use in cushioning one body relative to another. Elastomeric cushioning materials are elastic (i.e., capable of at least partially recovering size and shape after deformation). Elastomeric cushioning materials include materials referred to in the art as "elastomer gels," "gelatinous elastomers," or simply "gels."

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 atoms refers to groups having 1, 2, or 3 atoms. Similarly, a group having 1-5 atoms refers to groups having 1, 2, 3, 4, or 5 atoms, and so forth.

As understood by one of ordinary skill in the art, "molecular weight" (also known as "relative molar mass") is a dimensionless quantity but is converted to molar mass by multiplying by 1 gram/mole or by multiplying by 1 Da—for example, a compound with a weight-average molecular weight of 5,000 has a weight-average molar mass of 5,000 g/mol and a weight-average molar mass of 5,000 Da.

Elastomeric Cushioning Materials

Elastomeric cushioning materials have a variety of uses, such as for mattresses, pillows, seating surfaces, shoe inserts, packaging, and medical devices. Elastomeric cushioning materials may be formulated and/or configured to reduce peak pressure on a cushioned body, which may increase comfort for humans or animals, and may protect objects from damage. Elastomeric cushioning materials may be formed of materials that deflect or deform under load. Different elastomeric cushioning materials may have different responses to a given pressure, and some materials may be well suited to different applications. Elastomeric cushioning materials may be used in combination with one another to achieve selected properties.

However, conventional elastomeric cushioning materials may have certain undesirable properties that affect their performance. The properties may include self-adhesion, decreased strain recovery, and non-recoverable deformation.

Self-adhesion of elastomeric materials is the ability of an elastomeric material to bond to itself without external adhesives or bonding agents. While this property can be useful in certain applications (e.g., in gaskets), it is undesirable in cushioning materials that rely on flexibility, resilience, and consistent performance over time. Self-adhesion in cushioning materials may lead to, for example, loss of structural integrity, inconsistent performance, difficulty in recovery, damage during handling, and reduced durability.

Decreased strain recovery is the ability of an elastomeric material to return to its original shape and/or size after being deformed by an external force, such as compression, tension, or bending. Strain recovery is useful in cushioning materials because it indicates how well the material can regain its original form after being compressed or stretched. Materials with high strain recovery will quickly return to their original state once the deforming force is removed, maintaining their effectiveness in absorbing impacts or providing support. Decreased strain recovery in cushioning materials may lead to, for example, loss of impact absorption, compromised comfort, reduced durability, inconsistent performance, and inability to withstand repeated use.

Non-recoverable deformation is permanent change in the shape or size of a material that occurs when it is subject to stress or strain. Non-recoverable deformation means that the material does not return to its initial shape or size after the stress is released. This kind of deformation is also called plastic deformation or irreversible deformation. Non-recoverable deformation is undesirable for cushioning materials because it may reduce comfort, loss of impact absorption, compromised comfort, and decrease durability.

For example, a conventional elastomeric cushioning material may include an elastomeric block copolymer and plasticizer having a molecular weight of about 200 Da and a viscosity at 40° C. of about 2 cSt to about 20 cSt.

These conventional elastomeric cushioning materials may have undesirable self-adhesion. For example, these conventional elastomeric cushioning materials may have a self-adhesion force greater than 10.5 gram force (gf) at a temperature of about 20° C. to about 25° C.

These conventional elastomeric cushioning materials may also have limited strain recovery when strained for longer periods of time (e.g., about 10 minutes to about 20 minutes, about 40 minutes to about 80 minutes, 15 minutes, 60 minutes, or longer) at higher temperatures (e.g., about 35° C. to about 65° C., about 40° C. to about 60° C., or about 50° C.). For example, strain recovery may be less than 70% (e.g., 60% to 70%) after 15 minutes held at 100% strain and 50° C. This lack of strain recovery may decrease the performance of the elastomeric cushioning material. This may be a problem where the temperature of the elastomeric cushioning material is raised to body temperature during use, and where the elastomeric cushioning material is transported in a strained shape (e.g., roll packed). For example, an elastomeric cushioning material may be transported in a shipping container where it is exposed to temperatures up to about 60° C.

These conventional elastomeric cushioning materials may also have greater amounts of nonrecoverable deformation, for example after being strained for longer periods of time (e.g., about 10 minutes to about 20 minutes, about 40 minutes to about 80 minutes, 15 minutes, 60 minutes, or longer) at higher temperatures (e.g., about 35° C. to about 65° C., about 40° C. to about 60° C., or about 50° C.).

Disclosed herein are elastomeric cushioning materials with reduced self-adhesion, increased strain recovery, and less non-recoverable deformation. These elastomeric cushioning materials may include an elastomeric block copolymer and plasticizer disposed in the elastomeric polymer network. The plasticizer may have an average molecular weight of about 300 Da to about 800 Da and a viscosity at 40° C. of about 20 cSt to about 10,000 cSt. The higher viscosity plasticizer used in the elastomeric cushioning materials, as compared to conventional lower viscosity plasticizer, may provide elastomeric cushioning materials with these beneficial properties.

The plasticizer may include a blend of plasticizers with different viscosities. For example, the blend of plasticizers may include a first plasticizer having a viscosity at 40° C. of about 20 cSt to about 10,000 cSt and a second plasticizer having a viscosity at 40° C. of about 2 cSt to about 20 cSt. For example, the blend of plasticizers may include a first plasticizer having a viscosity at 40° C. of about 100 cSt to about 500 cSt, a second plasticizer having a viscosity at 40° C. of about 2 cSt to about 20 cSt, and a third plasticizer having a viscosity at 40° C. of about 20 cSt to about 100 cSt.

In an aspect, an elastomeric cushioning element includes elastomeric polymer network comprising a triblock copolymer and a plasticizer disposed in the elastomeric polymer network.

The elastomeric polymer network may be about 5 wt. % to about 50 wt. % (e.g., about 5 wt. % to about 40 wt. %, about 5 wt. % to about 30 wt. %, about 5 wt. % to about 20 wt. %, about 5 wt. % to about 10 wt. %, about 10 wt. % to about 50 wt. %, about 20 wt. % to about 50 wt. %, about 30 wt. % to about 50 wt. %, about 40 wt. % to about 50 wt. %, or any range including and/or in-between any two of these values) of the total weight of the elastomeric cushioning element.

The plasticizer may be about 50 wt. % to about 95 wt. % (e.g., about 50 wt. % to about 90 wt. %, about 50 wt. % to about 80 wt. %, about 50 wt. % to about 70 wt. %, about 50 wt. % to about 60 wt. %, about 60 wt. % to about 95 wt. %, about 70 wt. % to about 95 wt. %, about 80 wt. % to about 95 wt. %, about 90 wt. % to about 95 wt. %, or any range including and/or in-between any two of these values) of the total weight of the elastomeric cushioning element.

The elastomeric cushioning element may include a ratio of plasticizer to elastomeric polymer network. The ratio may be particularly suited for certain types of cushioning elements. The ratio of plasticizer to elastomeric polymer network may be about 3.5:1 to about 8:1 (e.g., about 3.5:1 to about 7:1, about 3.5:1 to about 6:1, about 3.5:1 to about 5:1, about 4:1 to about 8:1, about 4:1 to about 7:1, about 5:1 to about 8:1, about 6:1 to about 8:1, or any range including and/or in-between any two of these values). The ratio of plasticizer to elastomeric polymer network may be about 5:1 to about 7.5:1 (e.g., about 5:1 to about 7:1, about 5:1 to about 6.5:1, about 5.5:1 to about 7.5:1, about 6:1 to about 7.5:1, about 6:1 to about 7:1, or any range including and/or in-between any two of these values). For example, the elastomeric cushioning element may be a pillow and have a ratio of plasticizer to elastomeric polymer network of about 5:1 to about 7.5:1. For example, the elastomeric cushioning element may be a mattress and have a ratio of plasticizer to elastomeric polymer network of about 4:1.

The triblock copolymer may have an average molecular weight of about 100,000 Da to about 500,000 Da (e.g., about 100,000 Da to about 400,000 Da, about 100,000 Da to about 300,000 Da, about 100,000 Da to about 200,000 Da, about 200,000 Da to about 500,000 Da, about 300,000 Da to about 500,000 Da, about 400,000 Da to about 500,000 Da, or any range including and/or in-between any two of these values).

The triblock copolymer may have molecules with a particular range or distribution of molecular weights. The triblock copolymer may have a wide range of molecular weights.

In any embodiment, at least 95 wt. % of molecules of the triblock copolymer may have molecular weights generally evenly distributed between 150,000 Da and 400,000 Da. In any embodiment, no more than 50% of the triblock copolymer molecules may have any one molecular weight between 150,000 Da and 400,000 Da.

In any embodiment, at least 80 wt. % of molecules of the triblock copolymer may have molecular weights generally evenly distributed between 100,000 Da and 300,000 Da. In any embodiment, a distribution of the molecular weights of the triblock copolymer molecules between 100,000 Da and 300,000 Da may not be centered about a single data point.

In any embodiment, at least 80 wt. % of molecules of the triblock copolymer may have molecular weights generally evenly distributed between 150,000 Da and 250,000 Da. In any embodiment, no more than 50% of the copolymer molecules may have any one molecular weight between 150,000 Da and 250,000 Da.

The triblock copolymer may be an A-B-A triblock copolymer such as styrene ethylene propylene styrene (SEPS), styrene ethylene butylene styrene (SEBS), and styrene ethylene ethylene propylene styrene (SEEPS). For example, A-B-A triblock copolymers are currently commercially available from Kuraray America, Inc., of Houston, Tex., under the trade name SEPTON® 4055, and from Kraton Polymers, LLC, of Houston, Tex., under the trade names KRATON® E1830, KRATON® G1650, and KRATON® G1651. In these examples, the "A" blocks are styrene. The "B" block may be rubber (e.g., butadiene or isoprene) or hydrogenated rubber (e.g., ethylene/propylene, ethylene/butylene, or ethylene/ethylene/propylene) capable of being plasticized with mineral oil or other hydrocarbon fluids.

The elastomeric polymer network may include elastomeric polymers other than styrene-based copolymers, such as non-styrenic elastomeric polymers that are thermoplastic in nature or that can be solvated by plasticizers or that are multi-component thermoset elastomers.

Nonlimiting examples of the triblock copolymer may include styrene-ethylene-butylene-styrene triblock copolymer (SEBS), polystyrene-block-poly(ethylene-co-(ethylene-propylene)-block-polystyrene (SEEPS), polystyrene-block-polybutadiene-block-polystyrene (SBS), poly-styrene-block-polyisobutylene-block-polystyrene (SIBS), polystyrene-block-polyisoprene-block-polystyrene (SIS), polyether(urethane-urea) (PEUU), polymethacrylate-butadiene-styrene (MBS), or a combination of any two or more thereof. For example, the triblock copolymer may be SEBS.

The plasticizer may have an average molecular weight of about 300 Da to about 800 Da (e.g., about 300 Da to about 750 Da, about 300 Da to about 700 Da, about 300 Da to about 650 Da, about 500 Da to about 750 Da, about 500 Da to about 700 Da, about 500 Da to about 650 Da, about 550 Da to about 800 Da, about 600 Da to about 800 Da, about 650 Da to about 800 Da, or any range including and/or in-between any two of these values). The plasticizer may have a viscosity at 40° C. of about 20 cSt to about 10,000 cSt (e.g., about 20 cSt to about 9,500 cSt, about 20 cSt to about 8,000 cSt, about 20 cSt to about 5,000 cSt, about 20 cSt to about 2,000 cSt, about 20 cSt to about 1,500 cSt, about 20 cSt to about 1,000 cSt, about 20 cSt to about 500 cSt, about 20 cSt to about 200 cSt, about 20 cSt to about 100 cSt, about 20 cSt to about 50 cSt, about 30 cSt to about 10,000 cSt, about 50 cSt to about 10,000 cSt, about 50 cSt to about 500 cSt, about 100 cSt to about 10,000 cSt, about 100 cSt to about 500 cSt, about 200 cSt to about 10,000 cSt, about 500 cSt to about 10,000 cSt, about 1,000 cSt to about 10,000 cSt, about 1,500 cSt to about 10,000 cSt, about 2,000 cSt to about 10,000 cSt, about 5,000 cSt to about 10,000 cSt, or any range including and/or in-between any two of these values).

The plasticizer may further include a second plasticizer having a molecular weight of about 200 Da to about 500 Da (e.g., about 200 Da to about 450 Da, about 200 Da to about 400 Da, about 200 Da to about 350 Da, about 250 Da to about 500 Da, about 300 Da to about 500 Da, about 350 Da to about 500 Da, about 400 Da to about 500 Da, or any range including and/or in-between any two of these values) and a viscosity at 40° C. of about 2 cSt to about 20 cSt (e.g., about 2 cSt to about 18 cSt, about 2 cSt to about 15 cSt, about 2 cSt to about 10 cSt, about 2 cSt to about 5 cSt, about 5 cSt to about 20 cSt, about 5 cSt to about 15 cSt, about 5 cSt to about 10 cSt, about 10 cSt to about 20 cSt, about 8 cSt to about 20 cSt, about 10 cSt to about 18 cSt, about 12 cSt to about 20 cSt, about 15 cSt to about 20 cSt, or any range including and/or in-between any two of these values).

The plasticizer may include a blend of plasticizers with different viscosities. For example, the blend of plasticizers may include a first plasticizer having a viscosity at 40° C. of about 20 cSt to about 10,000 cSt, and a second plasticizer having a viscosity at 40° C. of about 2 cSt to about 20 cSt. The blend of plasticizers may include a first plasticizer having a viscosity at 40° C. of about 20 cSt to about 10,000 cSt, a second plasticizer having a viscosity at 40° C. of about 2 cSt to about 20 cSt, and a third plasticizer having a viscosity at 40° C. of about 20 cSt to about 100 cSt.

The first plasticizer may have a viscosity at 40° C. of about 20 cSt to about 10,000 cSt (e.g., about 20 cSt to about 9,500 cSt, about 20 cSt to about 8,000 cSt, about 20 cSt to about 5,000 cSt, about 20 cSt to about 2,000 cSt, about 20 cSt to about 1,500 cSt, about 20 cSt to about 1,000 cSt, about 20 cSt to about 500 cSt, about 20 cSt to about 200 cSt, about 20 cSt to about 100 cSt, about 20 cSt to about 50 cSt, about 30 cSt to about 10,000 cSt, about 50 cSt to about 10,000 cSt, about 50 cSt to about 500 cSt, about 100 cSt to about 10,000 cSt, about 100 cSt to about 500 cSt, about 200 cSt to about 10,000 cSt, about 500 cSt to about 10,000 cSt, about 1,000 cSt to about 10,000 cSt, about 1,500 cSt to about 10,000 cSt, about 2,000 cSt to about 10,000 cSt, about 5,000 cSt to about 10,000 cSt, or any range including and/or in-between any two of these values)

The second plasticizer may have a viscosity at 40° C. of about 2 cSt to about 20 cSt (e.g., about 2 cSt to about 18 cSt, about 2 cSt to about 15 cSt, about 2 cSt to about 10 cSt, about 2 cSt to about 5 cSt, about 5 cSt to about 20 cSt, about 5 cSt to about 15 cSt, about 5 cSt to about 10 cSt, about 10 cSt to about 20 cSt, about 8 cSt to about 20 cSt, about 10 cSt to about 18 cSt, about 12 cSt to about 20 cSt, about 15 cSt to about 20 cSt, or any range including and/or in-between any two of these values).

The third plasticizer may have a viscosity at 40° C. of about 20 cSt to about 100 cSt (e.g., about 20 cSt to about 90 cSt, about 20 cSt to about 80 cSt, about 20 cSt to about 70 cSt, about 20 cSt to about 60 cSt, about 20 cSt to about 50 cSt, about 30 cSt to about 100 cSt, about 40 cSt to about 100 cSt, about 50 cSt to about 100 cSt, about 60 cSt to about 100 cSt, about 70 cSt to about 100 cSt, or any range including and/or in-between any two of these values).

The plasticizer may be a blend of the first plasticizer and the second plasticizer. The plasticizer may include about 0.1 wt. % to about 80 wt. % (e.g., about 0.1 wt. %, about 0.5 wt. %, about 1.0 wt. %, about 5 wt. %, about 10 wt. %, about 20 wt. %, about 30 wt. %, about 40 wt. %, about 50 wt. %, about 60 wt. %, about 70 wt. %, about 80 wt. %, or any range including and/or in-between any two of these values) of the second plasticizer, with the balance being the first plasticizer.

The plasticizer may be a blend of a first plasticizer, a second plasticizer, and a third plasticizer. The plasticizer may include 1 wt. % to about 95 wt. % (e.g., about 1 wt. % to about 90 wt. %, about 1 wt. % to about 80 wt. %, about 1 wt. % to about 70 wt. %, about 1 wt. % to about 60 wt. %, about 1 wt. % to about 50 wt. %, about 5 wt. % to about 95 wt. %, about 10 wt. % to about 95 wt. %, about 20 wt. % to about 95 wt. %, about 30 wt. % to about 95 wt. %, about 40 wt. % to about 95 wt. %, about 50 wt. % to about 95 wt. %, about 60 wt. % to about 95 wt. %, about 70 wt. % to about 95 wt. %, about 80 wt. % to about 95 wt. %, or any range including and/or in-between any two of these values) of the first plasticizer; about 0.1 wt. % to about 80 wt. % (e.g., about 0.1 wt. %, about 0.5 wt. %, about 1.0 wt. %, about 5 wt. %, about 10 wt. %, about 20 wt. %, about 30 wt. %, about 40 wt. %, about 50 wt. %, about 60 wt. %, about 70 wt. %, about 80 wt. %, or any range including and/or in-between any two of these values) of the second plasticizer; and 1 wt. % to about 95 wt. % (e.g., about 1 wt. % to about 90 wt. %, about 1 wt. % to about 80 wt. %, about 1 wt. % to about 70 wt. %, about 1 wt. % to about 60 wt. %, about 1 wt. % to about 50 wt. %, about 5 wt. % to about 95 wt. %, about 10 wt. % to about 95 wt. %, about 20 wt. % to about 95 wt. %, about 30 wt. % to about 95 wt. %, about 40 wt. % to about 95 wt. %, about 50 wt. % to about 95 wt. %, about 60 wt. % to about 95 wt. %, about 70 wt. % to about 95 wt. %, about 80 wt. % to about 95 wt. %, or any range including and/or in-between any two of these values) of the third plasticizer.

The first plasticizer may include a white mineral oil. The first plasticizer may have a specific gravity at 25° C. of about 0.86 g/mL to about 0.88 g/mL (e.g., about 0.86 g/mL to about 0.87 g/mL, about 0.86 g/mL to about 0.865 g/mL, about 0.87 g/mL to about 0.88 g/mL, about 0.87 g/mL to about 0.875 g/mL, or any range including and/or in-between any two of these values).

For example, the first plasticizer may include Hydrobrite 1000. The first plasticizer may have the average molecular weight of about 600 Da to about 650 Da (e.g., about 600 Da to about 640 Da, about 600 Da to about 630 Da, about 610 Da to about 650 Da, about 620 Da to about 650 Da, about 630 Da to about 650 Da, or any range including and/or in-between any two of these values). The first plasticizer may have a viscosity at 40° C. of about 150 cSt to about 300 cSt (e.g., about 150 cSt to about 275 cSt, about 150 cSt to about 250 cSt, about 150 cSt to about 200 cSt, about 175 cSt to about 300 cSt, about 200 cSt to about 300 cSt, about 225 cSt to about 300 cSt, about 250 cSt to about 300 cSt, or any range including and/or in-between any two of these values). The first plasticizer may have an average carbon number at 5% distillation of about 25 to about 30 (e.g., 25, 26, 27, 28, 29, or 30). For example, the first plasticizer may have an average carbon number at 5% distillation of about 27, and the temperature of 5% distillation may be about 420° C. to about 430° C.

For example, the first plasticizer may include Hydrobrite HV. The first plasticizer may have the average molecular weight of about 650 Da to about 700 Da (e.g., about 650 Da to about 690 Da, about 650 Da to about 675 Da, about 660 Da to about 700 Da, about 670 Da to about 700 Da, about 680 Da to about 700 Da, or any range including and/or in-between any two of these values). The first plasticizer may have a viscosity at 40° C. of about 200 cSt to about 350 cSt (e.g., about 200 cSt to about 325 cSt, about 200 cSt to about 300 cSt, about 200 cSt to about 250 cSt, about 225 cSt to about 350 cSt, about 250 cSt to about 350 cSt, about 275 cSt to about 350 cSt, about 300 cSt to about 350 cSt, or any range including and/or in-between any two of these values). For example, the first plasticizer may have an average carbon number at 5% distillation of about 25 to about 30 (e.g., about 25, 26, 27, 28, 29, or 30).

For example, the first or third plasticizer may include a Sono Jell candle base. The first or third plasticizer may have an average molecular weight of about 300 Da to about 450 Da (e.g., about 300 Da to about 4250 Da, about 325 Da to about 400 Da, about 350 Da to about 400 Da, about 360 Da to about 380 Da, about 370 Da to about 380 Da, or any range including and/or in-between any two of these values). The first or third plasticizer may have a viscosity at 40° C. of about 20 cSt to about 25 cSt (e.g., about 20 cSt to about 24 cSt, about 20 cSt to about 23 cSt, about 20 cSt to about 22 cSt, about 21 cSt to about 25 cSt, about 22 cSt to about 25 cSt, about 23 cSt to about 25 cSt, or any range including and/or in-between any two of these values). The first plasticizer may have an average carbon number at 5% distillation of about 18 to about 23 (e.g., 18, 19, 20, 21, 22, or 23).

The second plasticizer may include a white mineral oil. For example, the second plasticizer may be a Britol 7 NF. The second plasticizer may have an average molecular weight of about 200 Da to about 400 Da (e.g., about 200 Da to about 375 Da, about 200 Da to about 350 Da, about 250 Da to about 350 Da, about 250 Da to about 325 Da, about 275 Da to about 325 Da, about 300 Da to about 325 Da, or any range including and/or in-between any two of these values). The second plasticizer may have a viscosity at 40° C. of about 10 cSt to about 14 cSt (e.g., about 10 cSt to about 13 cSt, about 10 cSt to about 12 cSt, about 10 cSt to about 11 cSt, about 11 cSt to about 14 cSt, about 12 cSt to about 14 cSt, about 13 cSt to about 14 cSt, or any range including and/or in-between any two of these values). The second plasticizer may have an average carbon number at 5% distillation of about 15 to about 20 (e.g., 15, 16, 17, 18, 19, 20).

The elastomeric cushioning material may include one or more fillers (e.g., lightweight microspheres). Fillers may affect thermal properties, density, processing, etc. of the elastomeric cushioning material. For example, hollow microspheres (e.g., hollow glass microspheres or hollow acrylic microspheres) may decrease the thermal conductivity of the elastomeric cushioning material by acting as an insulator. As another example, metal particles (e.g., aluminum, copper, etc.) may increase the thermal conductivity of the resulting elastomeric cushioning material. Microspheres filled with wax or another phase-change material (i.e., a material formulated to undergo a phase change near a temperature at which a cushioning element may be used) may provide temperature stability at or near the phase-change temperature of the wax or other phase-change material within the microspheres (i.e., due to the heat of fusion of the phase change).

The elastomeric cushioning element may have a self-adhesion force of about 1 gram force (gf) to about 10.5 gf (e.g., about 1 gf to about 10 gf, about 1 gf to about 9 gf, about 1 gf to about 8 gf, about 2 gf to about 10.5 gf, about 3 gf to about 10.5 gf, about 4 gf to about 10.5 gf, about 5 gf to about 10.5 gf, about 6 gf to about 10.5 gf, or any range including and/or in-between any two of these values) at a temperature of about 20° C. to about 25° C.

The elastomeric cushioning element may have a phase change at a temperature of about 25° C. to about 45° C. (e.g., about 25° C. to about 40° C., about 25° C. to about 35° C., about 25° C. to about 30° C., about 28° C. to about 45° C., about 30° C. to about 45° C., about 35° C. to about 45° C., about 38° C. to about 45° C., or any range including and/or in-between any two of these values).

The elastomeric cushioning element may have an average strain recovery after being held at 100% strain for 60 minutes at a temperature of 50° C. of about 85% to about 92% (e.g., about 85% to about 90%, about 85% to about 88%, about 86% to about 92%, about 87% to about 92%, about 88% to about 92%, about 89% to about 92%, or any range including and/or in-between any two of these values).

Methods of Forming Elastomeric Cushioning Materials

FIG. 1 is a block diagram of a method 100 of forming an elastomeric cushioning material. The method includes a first step 110 of dissolving an elastomeric polymer network comprising a triblock copolymer in a solvent to form a mixture; a second step 120 of adding a plasticizer to the mixture, the plasticizer being any of the plasticizers disclosed herein; and a third step 130 of removing the solvent from the mixture to form the elastomeric material.

Methods of Recovering Deformation of Elastomeric Cushioning Materials

Figure 2:
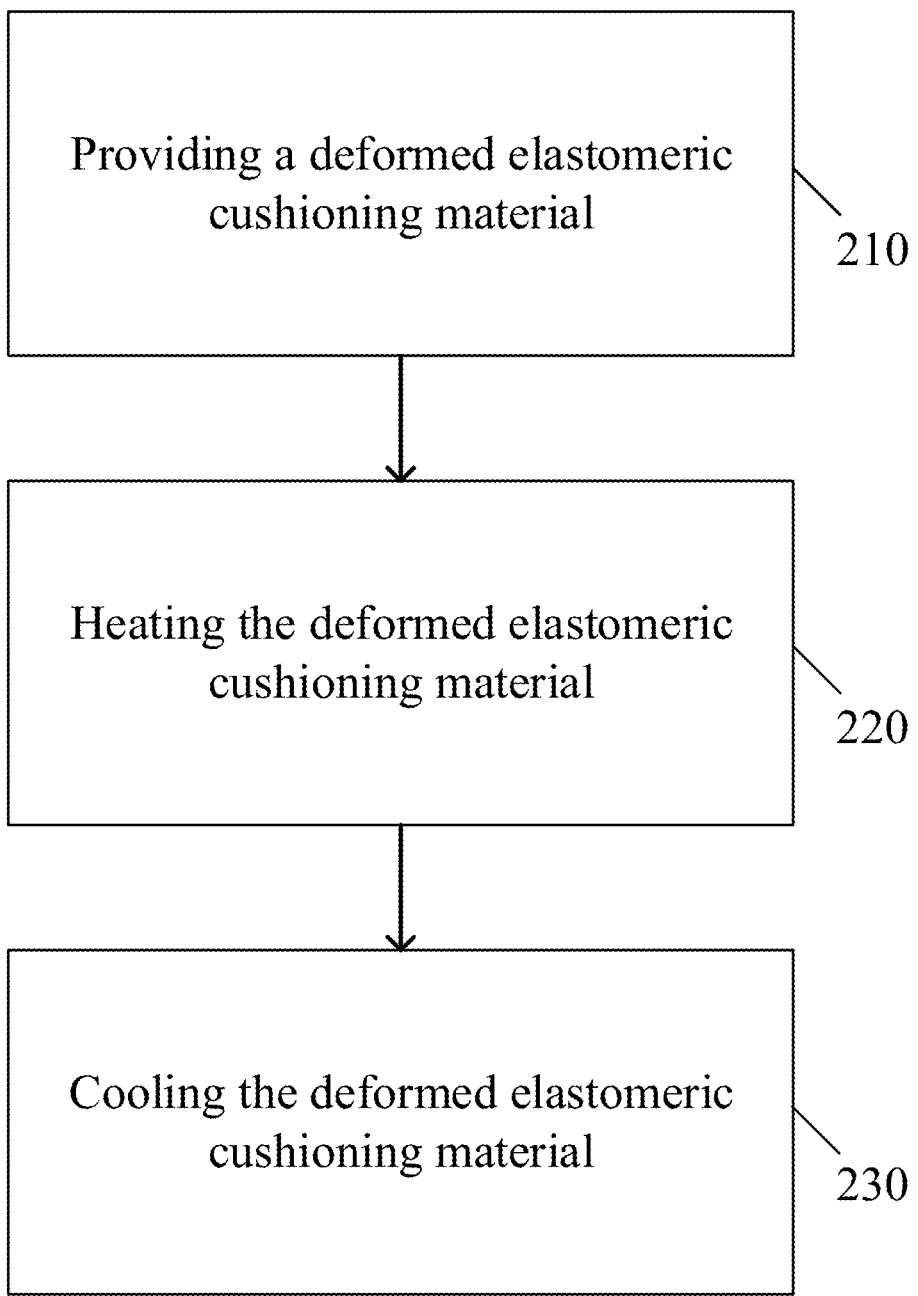
FIG. 2 is a block diagram of a method of reforming a deformed elastomeric cushioning material.

FIG. 2 is a block diagram of a method 200 of reforming a deformed elastomeric cushioning material. The method 200 includes the step 210 of providing a deformed elastomeric cushioning material; the step 220 of heating the deformed elastomeric cushioning material; and the step 230 of cooling the deformed elastomeric cushioning material.

The deformed elastomeric cushioning material may be recoverably deformed, non-recoverably deformed, or a combination thereof. The deformed elastomeric cushioning material may be formed by holding the elastomeric cushioning material under a strain (e.g., 10% to 100%, 50% to 100%, 100%, or any range including and/or in-between any two of these values). The deformed elastomeric cushioning material may be held under strain at a temperature of about 20° C. to about 65° C. (e.g., about 20° C. to about 60° C., about 20° C. to about 55° C., about 20° C. to about 50° C., about 25° C. to about 65° C., about 30° C. to about 65° C., about 40° C. to about 65° C., about 45° C. to about 65° C., or any range including and/or in-between any two of these values). The deformed elastomeric cushioning material may be held under strain for at least 10 minutes to 60 minutes (e.g., at least about 10 minutes to about 20 minutes, about 40 minutes to about 80 minutes, 15 minutes, 60 minutes, or longer). For example, the deformed elastomeric cushioning material may be formed by holding the elastomeric cushioning material under 100% strain at 40° C. for 15 minutes or 60 minutes.

The step 220 of heating the deformed elastomeric cushioning material may include heating the deformed elastomeric cushioning material at a temperature relative to the phase change material of the elastomeric cushioning material. For example, the temperature of heating may be about 35° C. to about 65° C. (e.g., about 40° C. to about 60° C., about 45° C. to about 55° C., about 50° C., or any range including and/or in-between any two of these values). The period of heating may be about 1 minute to about 90 minutes (e.g., about 10 minutes to about 20 minutes, about 40 minutes to about 80 minutes, 15 minutes, 60 minutes, or longer).

The step 230 of cooling the deformed elastomeric cushioning material may include cooling the elastomeric cushioning material from the temperature at step 220 to a temperature of about 20° C. to about 25° C. Cooling may be at a rate of about 0.01° C./minute to about 10° C./minute (e.g., about 0.01° C./minute to about 8° C./minute, about 0.01° C./minute to about 5° C./minute, about 0.1° C./minute to about 10° C./minute, about 0.5° C./minute to about 10° C./minute, about 1° C./minute to about 10° C./minute, about 2° C./minute to about 10° C./minute, about 3° C./minute to about 10° C./minute, or any range including and/or in-between any two of these values).

The present technology, thus generally described, will be understood more readily by reference to the following examples, which are provided by way of illustration and are not intended to be limiting of the present technology.

EXAMPLES

Example 1. Elastomeric Cushioning Element Self Adhesion

Properties of different plasticizers were characterized. Results of characterization are shown in Tables 1-4.

TABLE 1

| Properties of Britol 7 NF white mineral oil | | |
| --- | --- | --- |
| Test | Method | Test Result |
| Specific Gravity at 25° C./25° C. | ASTM D4052 | 0.8458 g/mL |
| Viscosity, kinetic at 40° C., mm$^2$/s | ASTM D445 | 11.96 cSt |
| Acidity | NF | Pass |
| Readily carbonizable substance | NF | Pass |
| Solid paraffin | NF | Pass |
| Limit of PA hydrocarbons | NF | Pass |
| Sulfur compounds | NF | Pass |
| Odor | LATM 092 | None |
| Color, saybolt | ASTM D156 | 30 |
| Weight per gallon at 60° C. | ASTM D4052 | 7.087 lb/gallon |

TABLE 1-continued

| Properties of Britol 7 NF white mineral oil | | |
| --- | --- | --- |
| Test | Method | Test Result |
| Residual solvents, reportable quantity | USP 467 | None |
| Infrared absorption | USP 197F | Pass |
| Molecular weight | ASTM D2502 | 306 Da |
| Carbon number at 5% distillation point | ASTM D2887 | 18 |

TABLE 2

| Properties of Hydrobrite HV white mineral oil | | |
| --- | --- | --- |
| Test | Method | Test Result |
| Specific Gravity at 25° C./25° C. | ASTM D4052 | 0.8743 g/mL |
| Viscosity, kinetic at 40° C., mm$^2$/s | ASTM D445 | 258.7 cSt |
| Acidity | NF | Pass |
| Readily carbonizable substance | NF | Pass |
| Solid paraffin | NF | Pass |
| Limit of PA hydrocarbons | NF | Pass |
| Sulfur compounds | NF | Pass |
| Odor | LATM 092 | None |
| Color, saybolt | ASTM D156 | 30 |
| Molecular weight | ASTM D2502 | 659 Da |
| Kinetic viscosity at 100° C. | ASTM D445 | 21.8 cSt |
| Carbon number at 5% distillation point | ASTM D2887 | 28 |
| Residual solvents, reportable quantity | USP 467 | None |
| Infrared absorption | USP 197F | Pass |

TABLE 3

| Properties of Sono Jell candle base wax | | |
| --- | --- | --- |
| Test | Method | Test Result |
| Gas chromatograph (GC) distillation 5% | ASTM D2887 | 683° F. |
| Viscosity at 40° C. | ASTM D445 | 23.3 cSt |
| Odor rating, panel average | LASTM 093 | 0.5 |
| Color, saybolt | ASTM D156 | 30 |
| Molecular weight | ASTM D2502 | 379 Da |
| Carbon number at 5% distillation point | ASTM D2887 | 21 |

TABLE 4

| Properties of Hydrobrite 1000 | | |
| --- | --- | --- |
| Test | Method | Test Result |
| Specific Gravity at 25° C./25° C. | ASTM D4052 | 0.8732 g/mL |
| Viscosity, kinetic at 40° C., mm$^2$/s | ASTM D445 | 205.40 cSt |
| Acidity | NF | Pass |
| Readily carbonizable substance | NF | Pass |
| Solid paraffin | NF | Pass |
| Limit of PA hydrocarbons | NF | Pass |
| Sulfur compounds | NF | Pass |
| Odor | LATM 092 | None |
| Color, saybolt | ASTM D156 | 30 |
| Simulated Distillation, 5% | ASTM D2887 | 426° C. |
| Viscosity, kinetic at 100° C. | ASTM D445 | 18.62 cSt |

TABLE 4-continued

| Properties of Hydrobrite 1000 | | |
|---|---|---|
| Test | Method | Test Result |
| Molecular weight | ASTM D2502 | 630 Da |
| Carbon number at 5% distillation point | ASTM D2887 | 27 |
| Residual solvents, reportable quantity | USP 467 | None |
| Infrared absorption | USP 197F | Pass |

Example 2. Elastomeric Cushioning Element Self Adhesion

Replacing a conventional plasticizer in an elastomeric cushioning element with a blend of plasticizers demonstrated a reduced surface tack at temperatures of about 20° C. to about 25° C. The elastomeric cushioning material was made of styrene-ethylene-butylene-styrene triblock copolymer (SEBS) and a plasticizer. A conventional plasticizer was compared to a blend of plasticizers.

The conventional plasticizer was Britol 7 NF white mineral oil having the properties in Table 1. The blend of plasticizers were either Britol 7 NF white mineral oil with a Hydrobrite HV white mineral oil or Sono Jell candle base wax. The Hydrobrite HV white mineral oil had the properties in Table 2. The Sono Jell candle base wax had the properties in Table 3.

Replacing greater than 50% of the Britol 7 NF white mineral oil plasticizer with either Hydrobrite HV white mineral oil or Sono Jell candle base wax in a small injection molded sheet greatly reduced the amount of self-adhesion of the sheet.

Figure 3A:
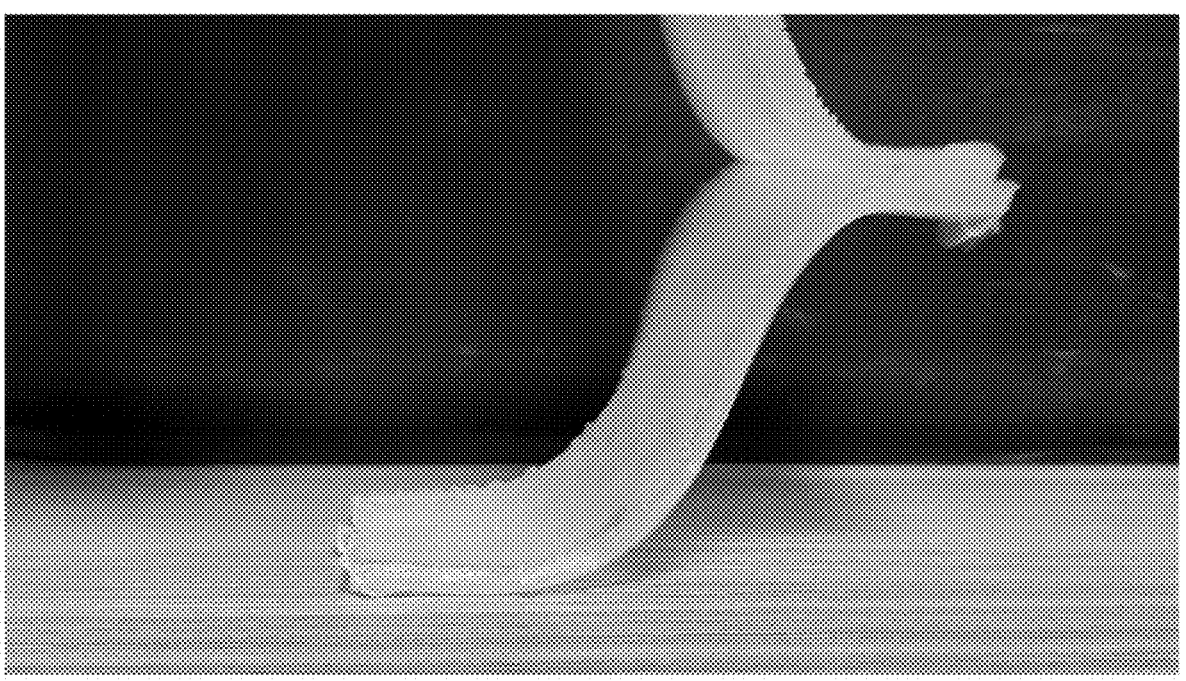
FIGS. 3A and 3B provide photographs illustrating elastomeric cushioning material self-adhesion.
Figure 3B:
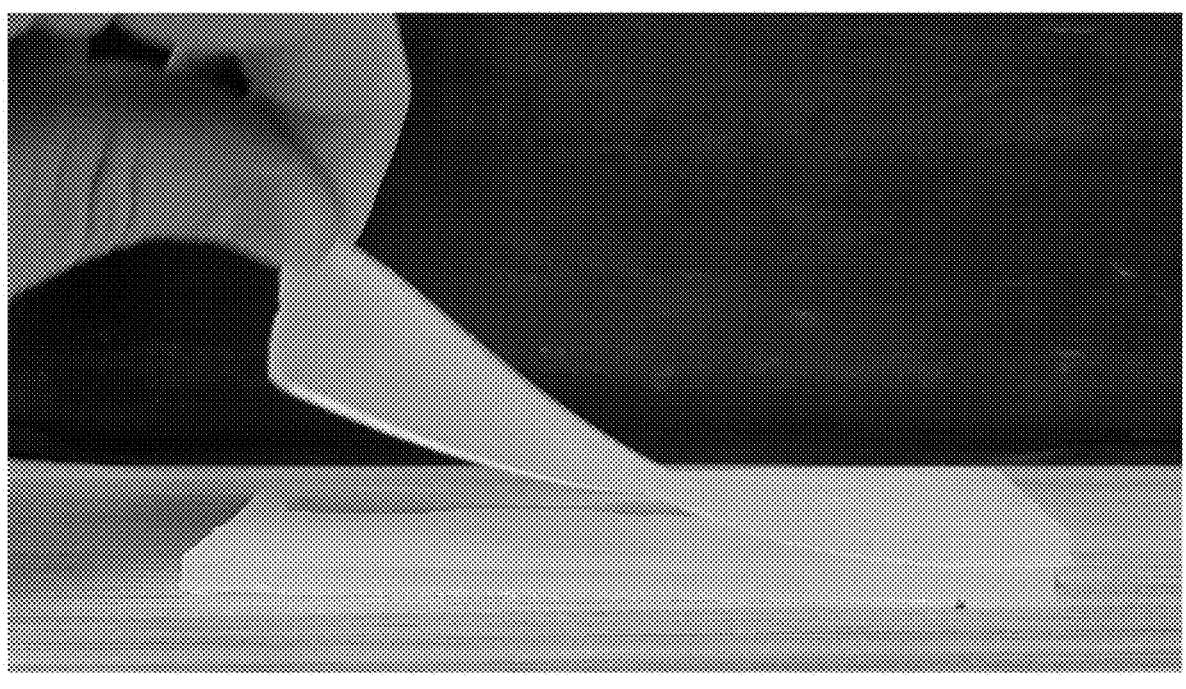

FIGS. 3A and 3B provide photographs illustrating elastomeric cushioning material self-adhesion. FIG. 3A illustrates self-adhesion of more than 10.83 gram force (gf) at temperatures of about 20° C. to about 25° C. for an elastomeric cushioning material made of SEBS and a Britol 7 NF white mineral oil plasticizer. FIG. 3B illustrates self-adhesion of less than 10.13 gf at temperatures of about 20° C. to about 25° C. for an elastomeric cushioning material made of SEBS and a plasticizer mix of 50 wt. % Britol 7 NF white mineral oil and 50 wt. % Sono Jell candle base wax.

Example 2. Elastomeric Cushioning Element Recoverable Deformation

An elastomeric cushioning element composed of a blend of polymer, Britol 7 NF white mineral oil, and Hydrobrite HV white mineral oil demonstrated a phase change between 25-35° C. This phase change was used to reverse the effects of previously non-recoverable deformation of the element, as demonstrated in FIGS. 3A and 3B.

Figure 4A:
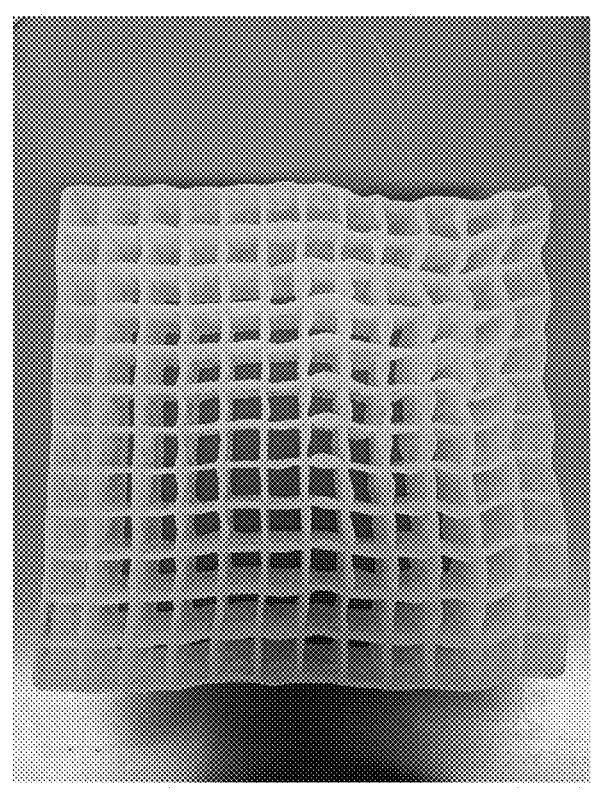
FIGS. 4A and 4B provide photographs illustrating deformation of elastomeric cushioning material made of styrene-ethylene-butylene-styrene triblock copolymer (SEBS) and a plasticizer having an average molecular weight of about 500 Da to about 800 Da and a viscosity at 40° C. of about 20 cSt to about 10,000 cSt.
Figure 4B:
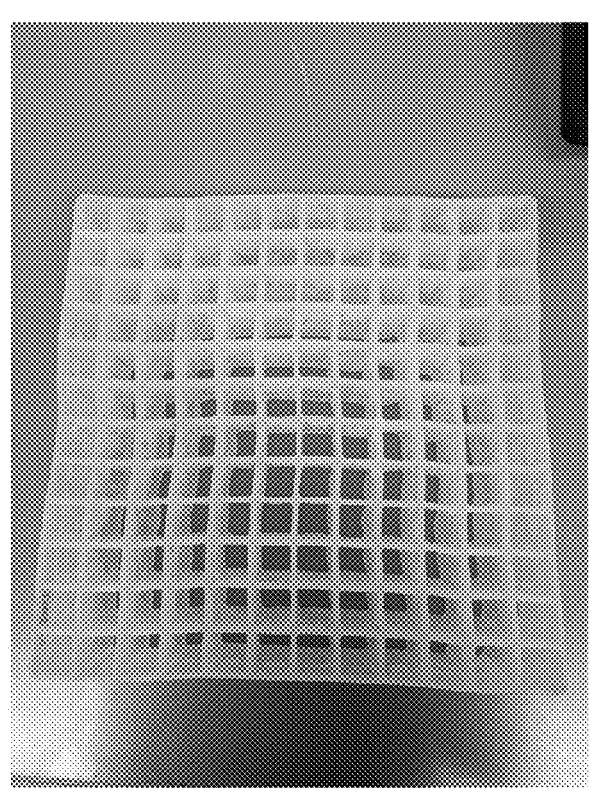

FIGS. 4A and 4B provide photographs illustrating deformation of the elastomeric cushioning material made of SEBS and a plasticizer blend of 50 wt. % Britol 7 NF white mineral oil and 50 wt. % Hydrobrite HV white mineral oil. FIG. 4A illustrates deformation of the elastomeric cushioning material formed by cooling the material from 40° C. to 25° C. while compressing it. FIG. 4B illustrates the same elastomeric cushioning material as in FIG. 4A after heating the material to 40° C. and cooling it to 25° C. to reverse the deformation shown in FIG. 4A.

Example 3. Improved Strain Recovery of Elastomeric Cushioning Materials

Replacing the lower viscosity Britol 7 NF white mineral oil plasticizer in an elastomeric cushioning element with blends of Britol 7 NF white mineral oil with the higher viscosity Hydrobrite HV white mineral oil demonstrated increased strain recovery at elevated temperature.

This strain recovery is advantageous for use in, for example, mattresses, pillows, and cushions, where the temperature of the elastomeric cushioning element is raised to body temperature during use, and further desirable during roll packed transport in shipping containers exposed to higher temperatures (e.g., about 40° C. to 60° C.).

Elastomeric cushioning element compositions and strain recovery data are shown in Table 5. Strain recoveries were measured as an average of three measurements after heating the element at a temperature of 50° C. for either 15 minutes or 60 minutes at 100% strain. The elastomeric cushioning element with SEBS and Britol 7 NF white mineral oil had an average strain recovery of 71.4% after 15 minutes held at 100% strain and 50° C. The elastomeric cushioning element with SEBS and Britol 7 NF white mineral oil and glass microspheres had an average strain recovery of 69.5% after 15 minutes held at 100% strain and 50° C.

TABLE 5

| Elastomeric cushioning element strain recovery | | | | |
|---|---|---|---|---|
| Sample | Britol Fraction | Hydrobrite Fraction | 15 min Strain Recovery (%) | 60 min Strain Recovery (%) |
| Mattress | — | — | 69.5 | 74.8 |
| OB03 | — | — | 71.4 | — |
| OB14 | 0.50 | 0.50 | — | 86.32 |
| OB15 | 0.00 | 1.00 | — | 90.20 |
| OB16 | 0.25 | 0.75 | — | 85.65 |

The elastomeric cushioning elements with SEBS and a plasticizer blend of 50 wt. % to 100 wt. % higher viscosity Hydrobrite HV white mineral oil with the balance the lower viscosity Britol 7 NF white mineral oil had average strain recoveries greater than 85%. Elastomeric cushioning elements with SEBS where the plasticizer was 100 wt. % Hydrobrite HV had average strain recoveries of greater than 90%.

It was observed that elastomeric cushioning elements including plasticizers with more than 50 wt. % Hydrobrite HV had increased surface tack. It was also observed that the Hydrobrite HV took longer to be absorbed by the SEBS in the gel. Without being bound by any theory, the observed surface tack may be result of a lower absorptive capacity of the SEBS copolymer for the higher viscosity Hydrobrite HV. Lower absorptive capacity may be undesirable for certain applications.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified. Finally, it will be understood that disclosure of one of the foregoing terms also discloses embodiments using any of the other two terms or their equivalents.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present technology may include, but is not limited to, the features and combinations of features recited in the following lettered paragraphs, it being understood that the following paragraphs should not be interpreted as limiting the scope of the claims as appended hereto or mandating that all such features must necessarily be included in such claims:

A. An elastomeric cushioning element comprising:
  about 5 wt. % to about 50 wt. % elastomeric polymer network comprising a triblock copolymer having an average molecular weight of about 100,000 Da to about 500,000 Da; and
  about 50 wt. % to about 95 wt. % plasticizer disposed in the elastomeric polymer network;
    wherein the plasticizer comprises a first plasticizer having an average molecular weight of about 300 Da to about 800 Da and a viscosity at 40° C. of about 20 cSt to about 10,000 cSt.

B. The elastomeric cushioning element of paragraph A, wherein the plasticizer further comprises a second plasticizer having a molecular weight of about 200 Da to about 500 Da and a viscosity at 40° C. of about 2 cSt to about 20 cSt.

C. The elastomeric cushioning element of paragraph B, wherein the second plasticizer comprises about 0.1 wt. % to about 80 wt. % of the plasticizer.

D. An elastomeric cushioning element for cushioning a body of a person comprising:
  about 5 wt. % to about 50 wt. % elastomeric polymer network comprising a triblock copolymer having a molecular weight of about 100,000 Da to about 500,000 Da; and
  about 50 wt. % to about 95 wt. % plasticizer disposed in the elastomeric polymer network;
  wherein the plasticizer comprises:
  a first plasticizer having a molecular weight of about 300 Da to about 800 Da and a viscosity at 40° C. of about 20 cSt to about 10,000 cSt; and
  a second plasticizer having a molecular weight of about 200 Da to about 500 Da and a viscosity at 40° C. of about 2 cSt to about 20 cSt, the second plasticizer comprising about 0.1 wt. % to about 80 wt. % of the plasticizer.

E. The elastomeric cushioning element of any one of the preceding paragraphs, wherein the first plasticizer is a white mineral oil.

F. The elastomeric cushioning element of any one of the preceding paragraphs, wherein the first plasticizer has a specific gravity at 25° C. of about 0.86 g/mL to about 0.88 g/mL.

F. The elastomeric cushioning element of any one of the preceding paragraphs, wherein the first plasticizer has an average carbon number at 5% distillation of about 25 to about 30.

G. The elastomeric cushioning element of any one of the preceding paragraphs, wherein the first plasticizer has the average molecular weight of about 600 Da to about 650 Da, the viscosity at 40° C. of about 150 cSt to about 300 cSt.

H. The elastomeric cushioning element of any one of the preceding paragraphs, wherein the first plasticizer has an average carbon number at 5% distillation of about 27, and a temperature of 5% distillation is about 420° C. to about 430° C.

I. The elastomeric cushioning element of any one of paragraphs A-G, wherein the first plasticizer has the average molecular weight of about 650 Da to about 700 Da, the viscosity at 40° C. of about 200 cSt to about 350 cSt.

J. The elastomeric cushioning element of any one of paragraphs A-G or I, wherein the first plasticizer has an average carbon number at 5% distillation of about 28.

K. The elastomeric cushioning element of any one of paragraphs A-D, wherein the first plasticizer has the average molecular weight of about 700 Da to about 800 Da, the viscosity at 40° C. of about 20 cSt to about 25 cSt.

L. The elastomeric cushioning element of any one of paragraphs A-D or K, wherein the first plasticizer has an average carbon number at 5% distillation of about 20 to about 30.

M. The elastomeric cushioning element of any one of paragraphs A-E, wherein the first plasticizer comprises an average molecular weight of about 300 Da to about 650 Da, a viscosity at 40° C. of about 150 cSt to about 450 cSt, and an average carbon number at 5% distillation of about 18 to about 30.

N. The elastomeric cushioning element of any one of paragraphs A-E, wherein the first plasticizer comprises an average molecular weight of about 600 Da to about 650 Da, a viscosity at 40° C. of about 150 cSt to about 300 cSt, and an average carbon number at 5% distillation of about 25 to about 30.

O. The elastomeric cushioning element of any one of paragraphs A-E, wherein the first plasticizer comprises an average molecular weight of about 650 Da to about 700 Da, a viscosity at 40° C. of about 200 cSt to about 350 cSt, and an average carbon number at 5% distillation of about 25 to about 30.

P. The elastomeric cushioning element of any one of paragraphs A-D, wherein the first plasticizer comprises average molecular weight of about 300 Da to about 450 Da, a viscosity at 40° C. of about 20 cSt to about 25 cSt, and an average carbon number at 5% distillation of about 18 to about 23.

Q. The elastomeric cushioning element of any one of paragraphs B-P, wherein the second plasticizer has the average molecular weight of about 200 Da to about 300 Da and a viscosity at 40° C. of about 10 cSt to about 14 cSt.

R. The elastomeric cushioning element of any one of paragraphs B-Q, wherein the second plasticizer has an average carbon number at 5% distillation of about 15 to about 20.

S. The elastomeric cushioning element of any one of paragraphs B-R, wherein the second plasticizer comprises an average molecular weight of about 200 Da to about 400 Da, a viscosity at 40° C. of about 10 cSt to about 14 cSt, and an average carbon number at 5% distillation of about 15 to about 20.

T. The elastomeric cushioning element of any one of the preceding paragraphs, wherein at least 95 wt. % of molecules of the triblock copolymer have molecular weights generally evenly distributed between 150,000 Da and 400,000 Da, and wherein no more than 50 wt. % of the triblock copolymer molecules have any one molecular weight between 150,000 Da and 400,000 Da.

U. The elastomeric cushioning element of any one of paragraphs A-S, wherein at least 80 wt. % of molecules of the triblock copolymer have molecular weights generally evenly distributed between 100,000 Da and 300,000 Da, and wherein a distribution of the molecular weights of the triblock copolymer molecules between 100,000 Da and 300,000 Da is not centered about a single data point.

V. The elastomeric cushioning element of any one of paragraphs A-S, wherein at least 80 wt. % of molecules of the triblock copolymer have molecular weights generally evenly distributed between 150,000 Da and 250,000 Da, and wherein no more than 50 wt. % of the copolymer molecules have any one molecular weight between 150,000 Da and 250,000 Da.

W. The elastomeric cushioning element of any one of the preceding paragraphs, wherein the triblock copolymer comprises styrene-ethylene-butylene-styrene triblock copolymer (SEBS), polystyrene-block-poly(ethylene-co-(ethylene-propylene)-block-polystyrene (SEEPS), polystyrene-block-polybutadiene-block-polystyrene (SBS), poly-styrene-block-polyisobutylene-block-polystyrene (SIBS), polystyrene-block-polyisoprene-block-polystyrene (SIS), polyether(urethane-urea) (PEUU), polymethacrylate-butadiene-styrene (MBS), or a combination of any two or more thereof.

X. The elastomeric cushioning element of any one of paragraphs A-V, wherein the triblock copolymer comprises styrene-ethylene-butylene-styrene triblock copolymer (SEBS).

Y. The elastomeric cushioning element of any one of the preceding paragraphs comprising a 3.5:1 to 8:1 ratio of plasticizer to elastomeric polymer network.

Z. The elastomeric cushioning element of any one of the preceding paragraphs comprising a 4:1 ratio of plasticizer to elastomeric polymer network.

AA. The elastomeric cushioning element of any one of paragraphs A-Y comprising a 5:1 to 7.5:1 ratio of plasticizer to elastomeric polymer network.

AB. The elastomeric cushioning element of any one of the preceding paragraphs, further comprising microspheres.

AC. The elastomeric cushioning element of any one of the preceding paragraphs, wherein the elastomeric cushioning element is for cushioning a body of a person.

AD. The elastomeric cushioning element of any one of the preceding paragraphs, wherein the elastomeric cushioning element has a self-adhesion force of about 1 gram force (gf) to about 10.5 gf.

AE. The elastomeric cushioning element of any one of the preceding paragraphs, wherein the elastomeric cushioning element has a phase change at a temperature of about 25° C. to about 35° C.

AF. The elastomeric cushioning element of any one of the preceding paragraphs, wherein the elastomeric cushioning element has an average strain recovery after being held at 100% strain for 60 minutes at a temperature of 50° C. of about 85% to about 92%.

AG. A method of forming an elastomeric material comprising:

dissolving an elastomeric polymer network comprising a triblock copolymer having a molecular weight of about 100,000 Da to about 500,000 Da in a solvent to form a mixture;

adding a plasticizer to the mixture, the plasticizer having a molecular weight of about 300 Da to about 800 Da and a viscosity at 40° C. of about 100 cSt to about 10,000 cSt; and removing the solvent from the mixture to form the elastomeric material.

Other embodiments are set forth in the following claims.

The invention claimed is:

1. An elastomeric cushioning element comprising:

about 5 wt. % to about 50 wt. % elastomeric polymer network comprising a triblock copolymer having an average molecular weight of about 100,000 Da to about 500,000 Da; and about 50 wt. % to about 95 wt. % plasticizer disposed in the elastomeric polymer network;

wherein the plasticizer comprises a first plasticizer having an average molecular weight of about 300 Da to about 800 Da and a viscosity at 40° C. of about 20 cSt to about 10,000 cSt;

wherein the plasticizer further comprises a second plasticizer having a molecular weight of about 200 Da to about 500 Da and a viscosity at 40° C. of about 2 cSt to about 20 cSt.

2. The elastomeric cushioning element of claim 1, wherein the second plasticizer comprises about 0.1 wt. % to about 80 wt. % of the plasticizer.

3. The elastomeric cushioning element of claim 2, wherein the second plasticizer comprises about 10 wt. % to about 80 wt. % of the plasticizer.

4. The elastomeric cushioning element of claim 1, wherein the first plasticizer is a white mineral oil.

5. The elastomeric cushioning element of claim 1, wherein the first plasticizer has a specific gravity at 25° C. of about 0.86 to about 0.88.

6. The elastomeric cushioning element of claim 1, wherein the first plasticizer has an average carbon number at 5% distillation of about 25 to about 30.

7. The elastomeric cushioning element of claim 1, wherein the first plasticizer has an average carbon number at 5% distillation of about 20 to about 30.

8. The elastomeric cushioning element of claim 1, wherein the first plasticizer comprises an average molecular weight of about 300 Da to about 650 Da, a viscosity at 40° C. of about 150 cSt to about 450 cSt, and an average carbon number at 5% distillation of about 18 to about 30.

9. The elastomeric cushioning element of claim 1, wherein the first plasticizer comprises an average molecular weight of about 650 Da to about 700 Da, a viscosity at 40° C. of about 200 cSt to about 350 cSt, and an average carbon number at 5% distillation of about 25 to about 30.

10. The elastomeric cushioning element of claim 1, wherein the second plasticizer has the average molecular weight of about 200 Da to about 300 Da and a viscosity at 40° C. of about 10 cSt to about 14 cSt.

11. The elastomeric cushioning element of claim 1, wherein the second plasticizer has an average carbon number at 5% distillation of about 15 to about 20.

12. The elastomeric cushioning element of claim 1, wherein at least 95 wt. % of molecules of the triblock copolymer have molecular weights between 150,000 Da and 400,000 Da, and wherein no more than 50 wt. % of the triblock copolymer molecules have any one molecular weight between 150,000 Da and 400,000 Da.

13. The elastomeric cushioning element of claim 1, wherein the triblock copolymer comprises styrene-ethylene-butylene-styrene triblock copolymer (SEBS), polystyrene-block-poly(ethylene-co-(ethylene-propylene)-block-poly-styrene (SEEPS), polystyrene-block-polybutadiene-block-polystyrene (SBS), poly-styrene-block-polyisobutylene-block-polystyrene (SIBS), polystyrene-block-polyisoprene-block-polystyrene (SIS), polyether(urethane-urea) (PEUU), polymethacrylate-butadiene-styrene (MBS), or a combination of any two or more thereof.

14. The elastomeric cushioning element of claim 1, wherein the triblock copolymer comprises styrene-ethylene-butylene-styrene triblock copolymer (SEBS).

15. The elastomeric cushioning element of claim 1, further comprising a 3.5:1 to 8:1 ratio of plasticizer to elastomeric polymer network.

16. The elastomeric cushioning element of claim 1, further comprising microspheres.

17. The elastomeric cushioning element of claim 1, wherein the elastomeric cushioning element has a phase change at a temperature of about 25° C. to about 35° C.

18. The elastomeric cushioning element of claim 1, wherein the elastomeric cushioning element has an average strain recovery after being held at 100% strain for 60 minutes at a temperature of 50° C. of about 85% to about 92%.

19. A method of forming an elastomeric material comprising:

dissolving an elastomeric polymer network comprising a triblock copolymer having a molecular weight of about 100,000 Da to about 500,000 Da in a solvent to form a mixture;

adding a plasticizer to the mixture, the plasticizer having a molecular weight of about 300 Da to about 800 Da and a viscosity at 40° C. of about 100 cSt to about 10,000 cSt; and removing the solvent from the mixture to form the elastomeric material.

* * * * *